United States Patent
Hachtel et al.

(10) Patent No.: US 7,248,042 B2
(45) Date of Patent: Jul. 24, 2007

(54) METHOD FOR THE CONTACTLESS DETERMINATION OF A THICKNESS OF A LAYER MADE OF ELECTRICALLY-CONDUCTIVE MATERIAL

(75) Inventors: Hansjoerg Hachtel, Weissach (DE); Stefan Meyer, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 10/561,258

(22) PCT Filed: Jun. 23, 2005

(86) PCT No.: PCT/EP2005/052925

§ 371 (c)(1),
(2), (4) Date: Dec. 19, 2005

(87) PCT Pub. No.: WO2006/005672

PCT Pub. Date: Jan. 19, 2006

(65) Prior Publication Data

US 2007/0096726 A1    May 3, 2007

(30) Foreign Application Priority Data

Jul. 15, 2004   (DE) ..................... 10 2004 034 081

(51) Int. Cl.
*G01B 7/06* (2006.01)
*G01B 7/14* (2006.01)
*G01N 27/72* (2006.01)
*G01R 33/00* (2006.01)

(52) U.S. Cl. ................. 324/229; 324/207.15; 324/230; 324/202

(58) Field of Classification Search ................ 324/202, 324/239–243, 229–230, 207.15, 207.16, 324/228
See application file for complete search history.

(56) References Cited

U.S. PATENT DOCUMENTS

| | | | |
|---|---|---|---|
| 5,889,401 | A | 3/1999 | Jourdain et al. |
| 6,198,278 | B1 | 3/2001 | Dobler et al. |
| 6,369,565 | B1 | 4/2002 | Dobler et al. |
| 6,377,039 | B1 | 4/2002 | Goldfine et al. |
| 6,479,990 | B2 | 11/2002 | Mednikov et al. |

FOREIGN PATENT DOCUMENTS

| | | |
|---|---|---|
| DE | 196 28 220 | 2/1998 |
| DE | 196 52 750 | 7/1998 |
| DE | 198 20 546 | 11/1999 |
| DE | 199 08 360 | 6/2000 |
| WO | 99/58923 | 11/1999 |

*Primary Examiner*—Bot LeDynh
(74) *Attorney, Agent, or Firm*—Michael J. Striker (57) ABSTRACT

With a method for the contactless determination of a thickness of a layer (20) made of electrically-conductive material of a component (17), a sensor composed of a coil form (13) and a coil (14) is positioned in the vicinity of the component (17) to be measured. The method is based on a combination of the principles of induction and eddy current. The thickness of the layer (20) is determined using a plurality of measuring and evaluation steps in which the coil (14) is acted upon with a first alternating current frequency f1 and a second alternating current frequency f2, and its change in inductance is evaluated. The distance between the coil form (13) and, therefore, the coil (14), and the component (17) is derived from the inductance value of the coil (14) acted upon with the second alternating current frequency f2.

10 Claims, 5 Drawing Sheets

METHOD FOR THE CONTACTLESS DETERMINATION OF A THICKNESS OF A LAYER MADE OF ELECTRICALLY-CONDUCTIVE MATERIAL

BACKGROUND INFORMATION

The present invention is directed to the method known from DE 196 52 750 C2 for determining a thickness of a layer made of electrically conductive material, in particular a chromium layer. The method is based on a combination of the principles of induction and eddy current. To carry out the measurement procedure, a sensor composed of a coil and a coil form is pressed with the aid of a spring against the surface of a component to be measured. The thickness of the layer is determined using a plurality of measuring and evaluation steps in which an alternating current is applied to the coil and its change in inductance is evaluated. Measurement errors in this procedure caused, e.g., by fluctuations in the material quality of the component, or by differences in the distance between the coil and the component due to contamination or wear can be diminished by introducing a normalized value. An unambiguous pairing of the measured inductance value with the corresponding layer thickness is also ensured as a result.

ADVANTAGES OF THE INVENTION

The method according to the present invention for determining a thickness of a layer made of electrically-conductive material having the features of the independent claim has the advantage that contactless measurement is made possible. As a result, a rapid procedure that has no detrimental effects on the object of measurement is provided. In addition, the risk of damage to a sensor and/or surface is eliminated.

Furthermore, with previous contact measurements, the object of measurement is inserted, with the layer to be investigated, on a resiliently-supported coil form and pressed against it to ensure plane-parallel contact of the object of measurement with the coil form. In so doing, the coil connecting wires leading to the coil are inevitably also moved and can therefore break after repeated measurements due to a high amount of wear. With the contactless measurement procedure according to the present invention, movement of the coil form and, therefore, breakage of the coil connecting wires is prevented.

With a contactless measurement procedure, a non-negligible manufacturing tolerance of the object of measurement can become problematic. When a manufacturing tolerance is not zero, it is possible for the air gap, i.e., the distance between the coil form and, therefore, the coil and the object of measurement, to fluctuate from measurement to measurement. A resultant corruption of the measured results is largely diminished by the method according to the present invention, so the object of measurement therefore need not be pressed against the coil form in every measurement cycle to prevent the distance from fluctuating.

The method also has all the advantages offered by the method described in the related art. In particular, mass-production coated parts can be inspected in a continuous measurement procedure.

Advantageous further developments and improvements of the method described in the independent claim are made possible as a result of the measures listed in the subclaims and the description.

DRAWING

An exemplary embodiment of the present invention is presented in the drawing and is described in greater detail in the description below.

A schematic design of the measurement device is shown in FIG. 1.

Shown in FIG. 2 is a graph of inductance L of the measuring coil plotted against thickness a of the layer to be determined at different distances and with different material qualities $\alpha$ and $\beta$ of the material located under the layer to be determined.

DETAILED DESCRIPTION OF THE EXEMPLARY EMBODIMENT

Figure 1:
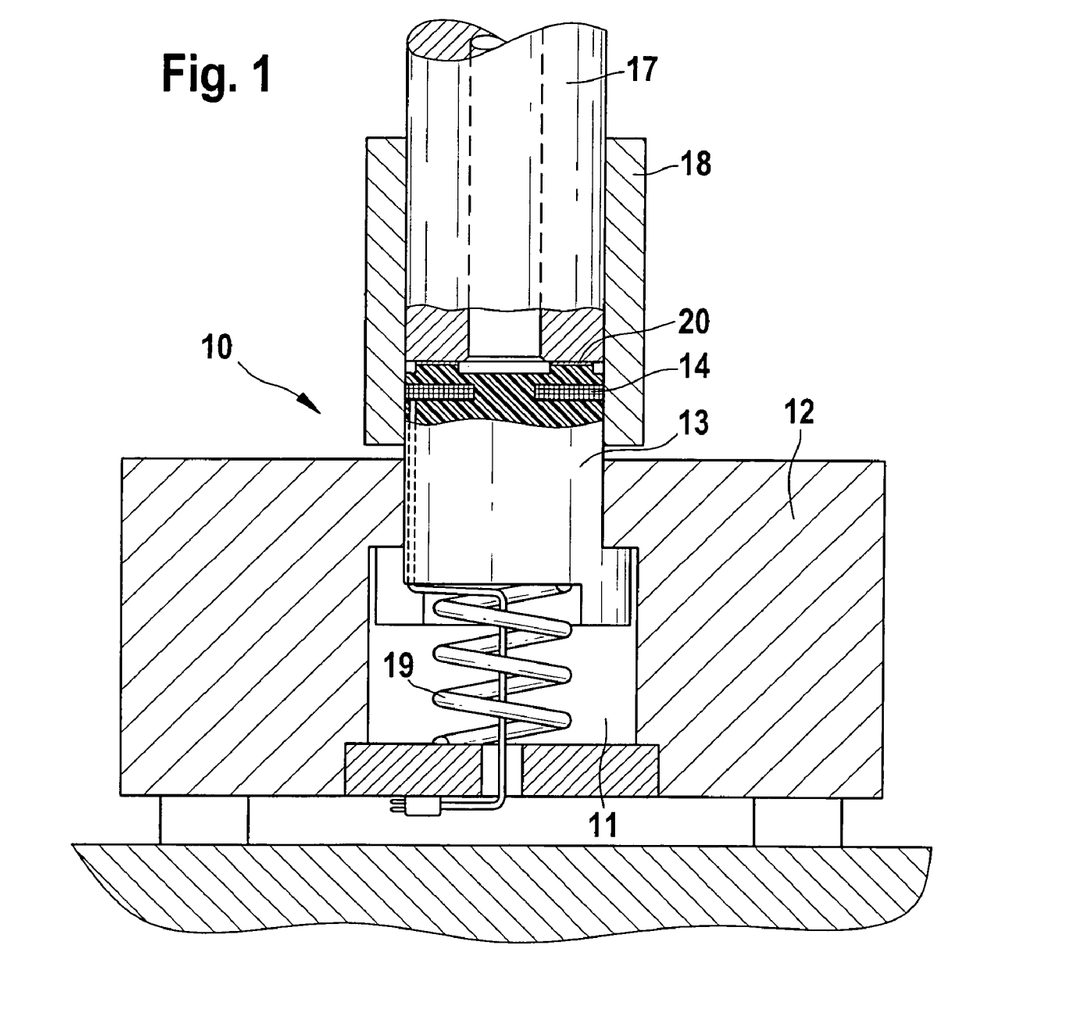

The measurement procedure according to the present invention is based on the "inductance-eddy current measuring principle". A possible device for carrying out the method is made known in DE 196 52 750 C2. The design of a sensor 10 used therefor is shown in FIG. 1. In this depiction, a component 17 is inserted on a coil form 13. In contrast, with the method according to the present invention, a contactless measurement is possible. Sensor 10 is located in recess 11 of a main body 12 and is composed of a coil form 13 on which a coil 14 carrying an alternating current is mounted. Coil 14 can be configured, e.g., as a flat coil or a ring coil. Coil form 13 is preferably composed of an electrically non-conductive and non-ferromagnetic material, e.g., plastic, and is guided nearly frictionlessly into recess 11. Component 17 to be monitored is inserted in a guide body 18 that positions component 17 and coil 14 relative to each other. With the aid of a spring 19, coil form 13 and, therefore, coil 14 are pressed against the surface of component 17, which is not necessary with the method according to the present invention. The surface has the layer 20 to be determined. Component 17 can be, e.g., the neck of an injection valve, and layer 20 can be a chromium layer. When an alternating current flows through coil 14, an alternating magnetic field is produced that penetrates the chromium layer and the material layer under it, which is composed of the ferromagnetic material of component 17.

In the chromium layer, only the eddy-current effect takes place, while the inductance and eddy-current effect takes place in the ferromagnetic material of component 17. The particular measurement effects that would occur if the other part were not present are described individually below. If an alternating current flows through coil 14 and the alternating magnetic field of coil 14 only meets an electrically highly-conductive but non-ferromagnetic material, i.e., if only the chromium layer were contacted by the alternating magnetic field of coil 14, then only the "eddy-current effect" takes place. The inductance of coil 14 is reduced due to the eddy currents that form in the electrically highly-conductive but non-ferromagnetic material.

Figure 2:
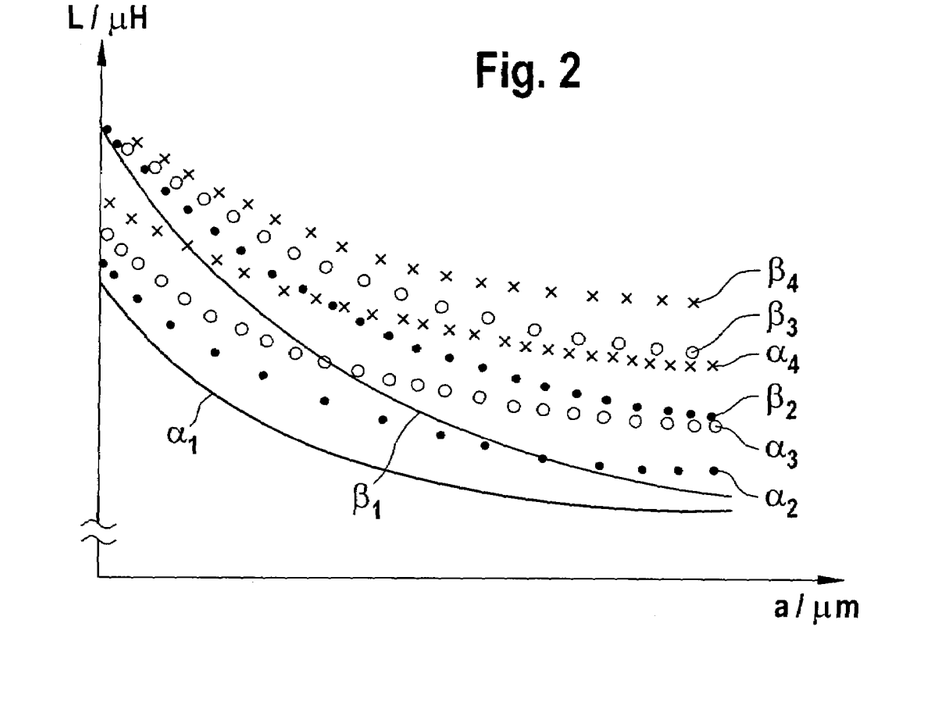

The effect of the magnetic field of coil 14 carrying an alternating current on the ferromagnetic material diametrically opposed to it, i.e., on the material of component 17, will now be described below. The alternating magnetic field of coil 14 through which the alternating current flows contacts the material of component 17. It should be noted that, with electrically conductive and ferromagnetic material, both the ferromagnetic effect and the eddy-current effect take place. While the eddy-current effect results in a reduction in inductance of measuring coil 14, the ferromagnetic effect—which is also referred to as the inductance effect in this publication—brings about an increase in the inductance of measuring coil 14. Which of the two effects prevails depends primarily on the frequency of the alternating current that flows through coil 14, and on the material quality of component 17. If these two measuring effects are transferred to component 17 with the chromium layer, it can be determined that, the thicker the chromium layer is, the weaker the formation of the magnetic field is and, therefore, the weaker the inductance of coil 14 is. In FIG. 2, α1 is a measurement curve that represents the decrease in inductance in measuring coil 14 as the thickness a of the chromium layer increases.

Figure 3:
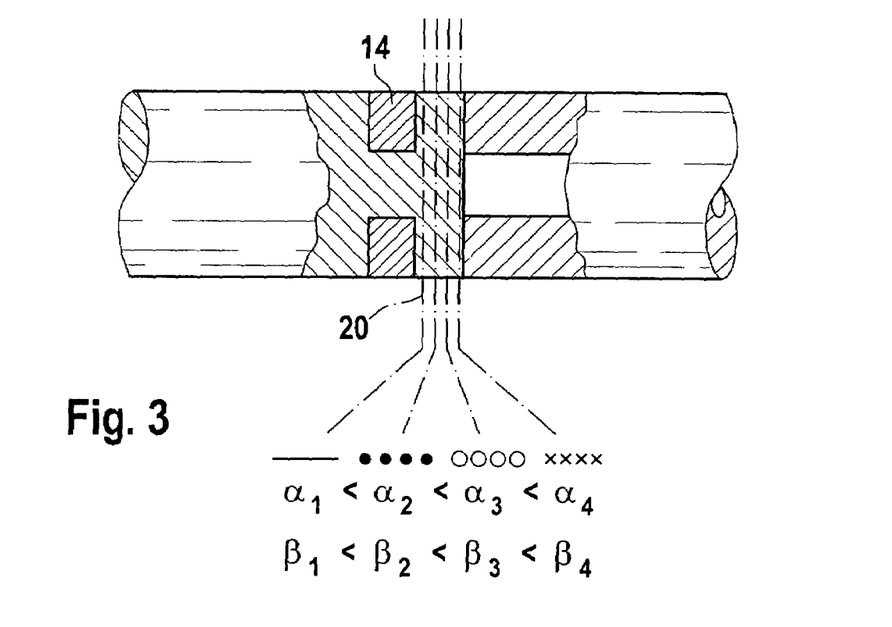
FIG. 3 shows the relationship of the different distances between the measuring coil and the object of measurement used in FIG. 2.

The shape of the measurement curve of inductance L plotted against layer thickness a depends on the material quality of component 17, however. That is, e.g., on the electrical resistance, the permeability of the material, and the distance between coil form 13 and/or coil 14 and the surface to be measured. If the distance between measuring coil 14 and the chromium layer changes, e.g., due to contamination or wear of coil form 13, different characteristic curves of the graph of inductance L versus layer thickness a result. Various examples are shown in FIG. 2. Characteristic curves α1, α2, α3 and α4 represent the graph of inductance L plotted against layer thickness a given different distances between measuring coil 14 and the chromium layer to be monitored, with the material quality of component 17 remaining the same. FIG. 3 shows the size of distance α between coil 14 and the chromium layer to be monitored. It is obvious that the distance becomes increasingly great from α1 to α4. Characteristic curves β1 through β4 represent a variation in the distance between the measuring coil and the chromium layer to be monitored given a second material quality of component 17. Based on the diagram shown in FIG. 2, it is obvious that a large number of possible layer thicknesses can be paired with a measured inductance value L. Instead of inductance, the alternating-current resistance value of coil 14 can be evaluated.

From the related art it is known to normalize the inductance values that were determined, the normalization resulting in a measured value that can be unequivocally assigned and eliminates the measurement errors described above. A total of three measurements are carried out for this purpose: A premeasurement and post-measurement with the object of measurement, and a measurement for normalization purposes carried out exclusively with respect to a layer made of the electrically conductive material. The measurement carried out for normalization purposes need not be carried out for every example. Instead, it is sufficient, in principle, to carry out a measurement for normalization purposes only when the sensor is replaced and, if necessary, to synchronize the measurement systems over a period of intervals.

The method according to the present invention now also makes it possible to perform a contactless measurement. A fundamental problem associated with a contactless measurement procedure is the fluctuation in the distance between coil form 13 and, therefore, coil 14, and the object of measurement. In this publication, the distance between coil form 13 and the object of measurement is also referred to as the "distance" or "air gap". The manufacturing tolerance of the component, as the object of measurement, that differs from zero, contributes to the distance fluctuation. In practice, the manufacturing tolerance is, e.g., 0.2 mm for the neck of injection valves. Assuming the measurement system has a minimum tolerance of 0.1 mm, the distance, i.e., the air gap between coil form 13 and component 17, can vary from one item to the next by 0.1 mm to 0.3 mm. The minimum distance in this case is therefore 0.1 mm and the maximum distance is 0.3 mm. If the method is carried out to perform a contactless determination of a layer thickness using the measurement and evaluation steps known from the related art, the distance fluctuations experienced above can make the measurement accuracy only slightly worse, given favorable measuring conditions. However, the measurement performed for normalization purposes must be carried out in addition for every measurement, including the premeasurement and post-measurement. The explanation of the two-frequency measuring method described below serves to demonstrate how the layer thickness can be determined with sufficient accuracy despite a fluctuating air gap without having to position a calibration part on the sensor in every measuring cycle and carry out a measurement for normalization purposes.

The method according to the present invention for determining the thickness of a layer is carried out using a plurality of measuring and evaluation steps, as known from the related art. Before component 17 is coated, an inductance value $L_{0,d,f1}$ of coil 14 is determined in a "first premeasurement". In this case, the first index "0" of the inductance value $L_{0,d,f1}$ refers to the thickness of the coating (0=uncoated), the second index "d" is the actual value of the distance between coil form 13 and component 17 (d has not yet been determined), and, finally, the third index "f1" is the first alternating-current frequency f1 with which coil 14 is acted upon (f1 is adjusted). During measurement, coil 14 is directed toward the uncoated surface (measuring surface) of component 17 facing coil 14, a distance d forming between coil form 13 and the surface of component 17. The exact value d of the distance is not known at this time and must therefore be determined. A measurement is carried out with respect to the material of uncoated component 17. Alternating-current frequency f1 applied to coil 14 is a frequency from the high-frequency range. A suitable value is, e.g., 4 MHz. The magnitude of the inductance value $L_{0,d,f1}$ also depends on the condition of component 17, in particular its magnetic and electrical properties. The condition of component 17 can fluctuate in series production. For this reason, the inductance value $L_{0,d,f1}$ must be determined at the beginning of the measuring procedure for every component 17 and stored in a data memory in an allocatable manner.

The first high-frequency premeasurement serves to determine a normalized value. In addition, in deviation from the method according to the related art, a second premeasurement is now carried out with a second alternating-current frequency f2. The second alternating-current frequency, f2, is a frequency from the low-frequency range. A suitable value is, e.g., 5 kHz. The first and second premeasurements are carried out practically simultaneously using the same system, since the switch from alternating-current frequency f1 to alternating-current frequency f2 is carried out in fractions of a second. The resultant inductance value, $L_{0,d,f2}$, serves to determine distance d between coil form 13 and component 17.

Figure 4:
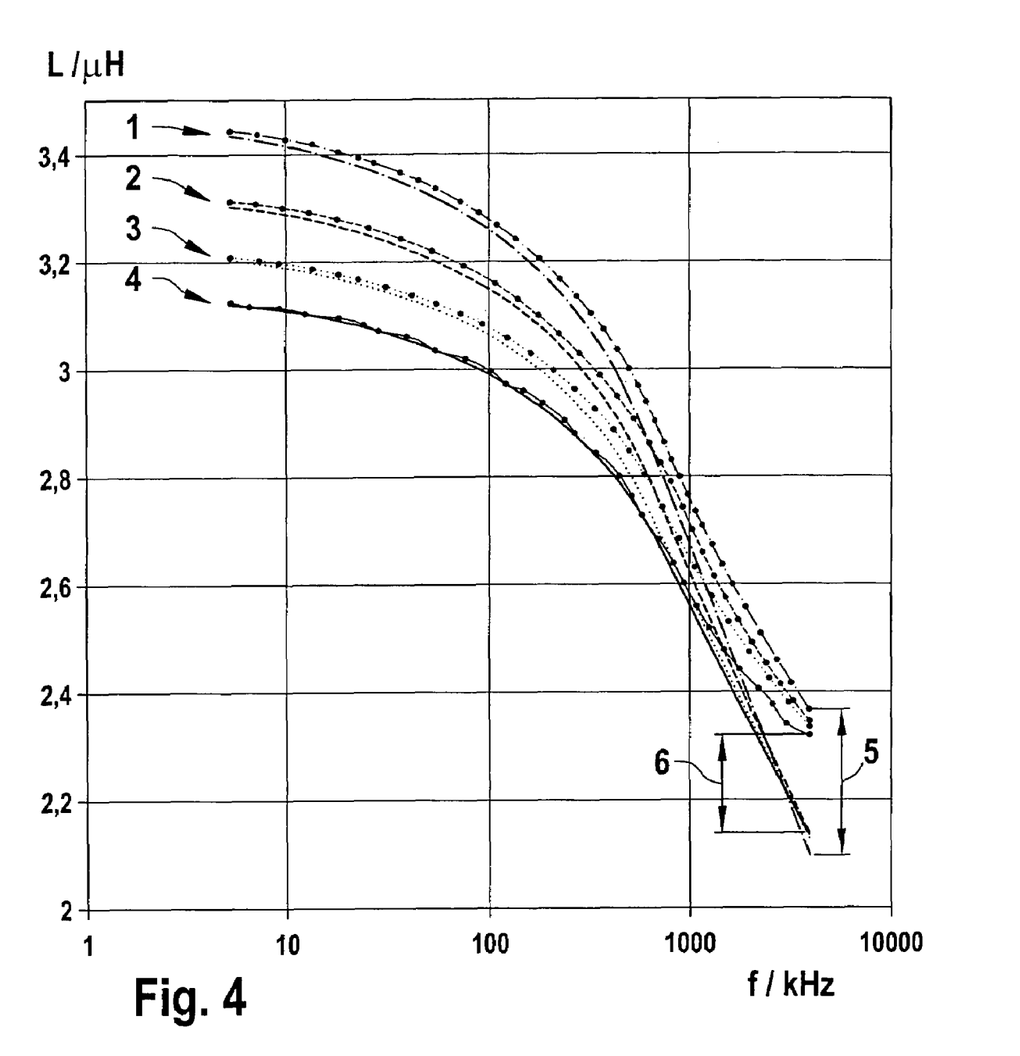
FIG. 4 shows the dependence of coil inductance on the air gap (distance between the coil form and the object of measurement), layer thickness and the frequency used.

The selection of the two frequencies from various frequency ranges for different purposes is explained with reference to FIG. 4. FIG. 4 clearly shows the dependence of measured inductance L of coil 14 on the distance between coil form 13 and the object of measurement, on layer thickness a and the alternating-current frequency, f, that is used. Curve pairs 1, 2, 3 and 4 are the graph of inductance values at different distance values d=0 mm, 0.1 mm, 0.2 mm and 0.3 mm. Measurements were carried out at each distance value d without coating and with a chromium coating of a=7 µm. The curves that represent the measurements carried out without coating are shown in FIG. 4 with points or similar markings on the curves. The graph of inductance values of coil 14 plotted against a broad frequency range at four different distances d—in each case with components 17 that are uncoated and coated with 7 µm chromium—shows that, primarily in the low-frequency range, e.g., 30 kHz, a change in distance causes a large measuring stroke and, in the high-frequency range, e.g., 3 MHz, a change in layer thickness causes a large measuring stroke.

Measuring stroke 5 at a distance of d=0 mm and measuring stroke 6 at a distance of d=0.3 mm caused by a change in layer thickness are plotted for example purposes.

To make it easier to replace a sensor, it is practical and useful to not convert inductance value $L_{0,d,f2}$ determined in the second premeasurement directly to a distance value, but to first convert it to a dimensionless characteristic value K using an algorithm. This characteristic value K is subsequently converted into a concrete distance value d with the aid of a previously-determined and stored distance characteristic. Characteristic value K is determined using equation 1:

$$K = A \cdot \frac{L_{0,d,f2} - L_{0,\max,f2}}{L_{0,\min,f2} + L_{0,\max,f2}},  \quad (1)$$

Figure 5:
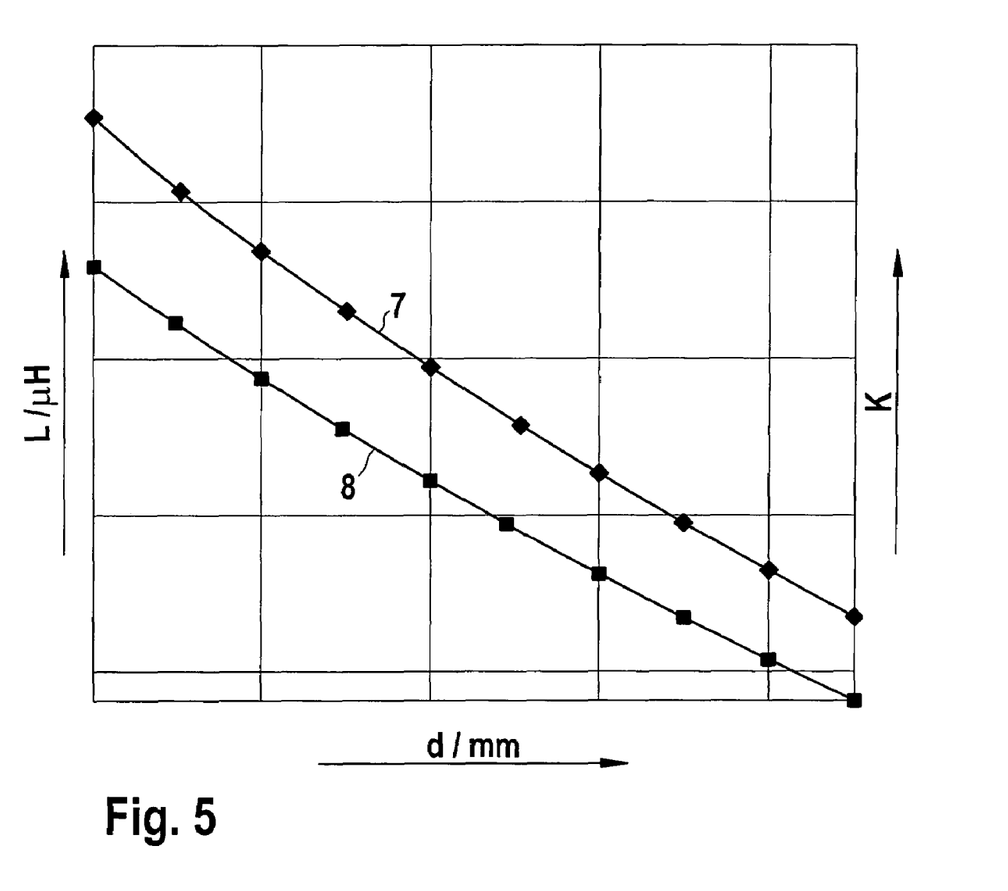
FIG. 5 shows a graph of coil inductance and the characteristic parameter plotted against the distance between the coil form and the object of measurement.

In which $L_{0,d,f2}$=inductance value of the 2nd premeasurement $L_{0,\min,f2}$=inductance value at a minimum distance between coil form 13 and the object of measurement $L_{0,\max,f2}$=inductance value at a maximum distance between coil form 13 and the object of measurement A=constant factor The two extreme inductance values $L_{0,\min,f2}$ and $L_{0,\max,f2}$ of coil 14 result when there is a minimum or maximum distance d between coil body 13 and component 17 or, in general, an object of measurement. For example, the minimum distance can be 0.1 mm, and the maximum distance can be 0.3 mm. The inductance L of coil 14 and the characteristic value K determined in equation 1 are plotted against distance d in FIG. 5. As shown by the graph of inductance 7 and distance characteristic 8, it is clear that the inductance and/or characteristic value is greatest when distance is at a minimum, and it decreases continually as distance increases.

If, in the $2^{nd}$ premeasurement, the value of distance d is the maximum distance, then the difference $L_{0,d,f2}-L_{0,\max,f2}$ disappears, of course, and the characteristic value is zero. If the distance characteristic was registered once, it can be used at any time to convert a characteristic value K into a value of distance d. In particular, even when sensor 10 and, therefore, coil 14, are replaced, no new distance characteristics need be recorded if geometric coil dimensions that are relevant for measurement purposes differ only within certain limits. In a case such as this, it is sufficient to only carry out the measurements to determine $L_{0,\max,f2}$ and $L_{0,\min,f2}$ and store the values. The constant factor A can be any positive number. For practical purposes, A is a multiple of 10, e.g., 100.

A layer of chromium is now applied to component 17 using an appropriate coating system. A third measurement is then carried out, i.e., a "post-measurement", which is carried out at the same point on component 17 where the premeasurements mentioned above were carried out. The measuring device must be designed such that distance d is equally great in the premeasurement and post-measurement. The result is an inductance value $L_{x,d,f1}$ of measuring coil 14, the first index "x" standing for the value of layer thickness a to be determined, the second index "d" standing for the distance between coil form 13 and coated component 17, and the third index "f1" standing for alternating-current frequency f1 applied to coil 14. The magnitude of inductance value $L_{x,d,f1}$ is determined, among other things, by the thickness of the chromium layer and the material quality of component 17. It should be ensured that both inductance values $L_{0,d,f1}$ and $L_{x,d,f1}$ that were determined are each allocated to the same component 17 in an unambiguous manner.

These two inductance values $L_{0,d,f1}$ and $L_{x,d,f1}$ are now converted via an algorithm to a normalized value, i.e., a dimensionless characteristic number that can be allocated to a corresponding layer thickness a. This normalized value is referred to as measured value $M_e$ in this case. In order to carry out this determination of the normalized value, inductance values $L_{\infty,AB,f1}$, f1 and $L_{0,AB,f1}$ must be determined, and these values must have been previously measured and stored. Inductance value $L_{\infty,AB,f1}$ is obtained when a measurement carried out exclusively with respect to a chromium layer is carried out on an object of measurement; the value of distance d between coil form 13 and the object of measurement is AB. The surface of the object of measurement must have a layer of chromium that is so thick that it shields practically the entire magnetic field of coil 14, so that neither the inductance effect nor the eddy-current effect can take place in the material of the object of measurement. An electrically conductive but non-ferromagnetic substance could be used instead of chromium on the object of measurement. Inductance value $L_{0,AB,f1}$ is obtained when a measurement is carried out exclusively with respect to an object of measurement made of ferromagnetic material; the value of distance d between coil form 13 and the object of measurement is AB. High-frequency alternating-current frequency f1 is used for both inductance values $L_{\infty,AB,f1}$ and $L_{0,AB,f1}$. The normalized value, or measured value $M_e$, is now determined using equation 2:

$$M_e = B \cdot \frac{L_{x,d,f1} - L_{0,f1}}{L_{\infty,AB,f1} - L_{0,AB,f1}}, \quad (2)$$

Figure 6:
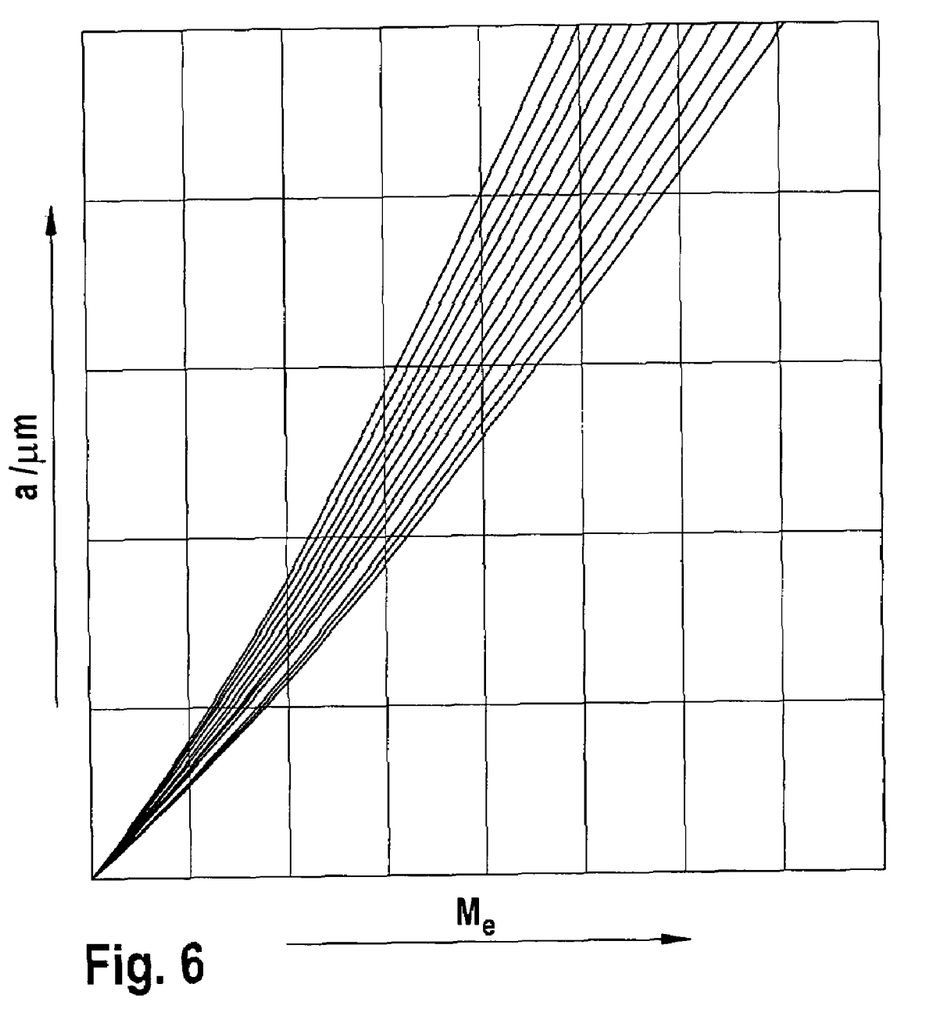
FIG. 6 shows a family of calibration curves with a plurality of calibration curves, each one representing a concrete, unique distance d.

In which $L_{x,d,f1}$=inductance value of the post-measurement $L_{0,d,f1}$=inductance value of the $1^{st}$ premeasurement $L_{\infty,AB,f1}$=inductance value of coil 14 determined in a measurement carried out exclusively with respect to an object of measurement made of the electrically conductive material; the value of distance d between coil form 13 and the object of measurement is AB $L_{0,AB,f1}$=inductance value of coil 14 determined in a measurement carried out exclusively with respect to an object of measurement made of the ferromagnetic material; the value of the distance d between coil form 13 and the object of measurement is AB B=constant factor Constant factor B can be any positive number. For practical purposes, B is a multiple of 10, e.g., 1000. The value that is half of the sum of the minimum and maximum distance between coil form 13 and the object of measurement can be selected as a possible value AB representing distance d between coil body 13 and the object of measurement. A typical value used in practical applications is AB=0.2 mm. With these concrete values for constant factor B and AB, and the measured inductance values—in contrast to the previous measuring method with only one calibration curve from the related art—a plurality of calibration curves is registered based on equation (2), each of which stands for a concrete, unique distance d. The distance serves as the parameter. The, e.g., twelve calibration curves in entirety represents a family of calibration curves, as shown in FIG. 6. Each of the individual calibration curves represents a certain distance value and shows, for this distance value, the shape of the graph of layer thickness a over a range of normalized values. In converting measured value $M_e$ to a layer thickness value a, the calibration curve that is selected is the one with a distance parameter value having the least deviation from the determined value of distance d, of course. In the ideal case, the least deviation is zero.

This measuring procedure can be used when the electrical and magnetic properties of parts—for example purposes—to be measured are sufficiently constant. It is recommended that this constancy be checked.

With inductive alternating current-layer thickness measurements, the measuring system must be designed such that the measured signal is not corrupted by inductive or capacitive coupling impedances if it is contacted or changed via electromagnetic in-coupling (the grounding issue must be taken into consideration). Whether or not a relevant contact measurement error occurs depends on the design of the measuring system and the carrier frequency. The following tends to apply: The higher the carrier frequency, the greater the risk that contact errors will occur. (These interrelationships also apply for the measuring methods described in DE 196 52 750 C2 and in other patents based on the same basic physical principle).

The following should be pointed out: Measurement errors can be caused not only by direct contact of the measuring devices and the sensors, but also by indirect contact. An example of indirect contact is: The supply cables from the measuring device to the sensor are located on or in the vicinity of a metal plate. If this metal plate is contacted, this can result in measurement errors, even if the point of contact is relatively far away from the cable positions. The occurrence of measurement errors of this type, if applicable, must be prevented using known methods.

What is claimed is:

1. A method for the contactless determination of a thickness of a layer (20) made of electrically-conductive material applied to a component (17) made of ferromagnetic material, the following measuring steps taking place with the aid of at least one measuring coil (14) carrying an alternating current and mounted on a coil form (13), the change in inductance of which is evaluated:

Determine the inductance value $L_{0,d,f1}$ of the coil (14) determined in a measurement carried out exclusively with respect to a component (17) as the object of measurement made of ferromagnetic material, the coil (14) being acted upon with a first alternating current frequency f1; the distance between the coil form (13) and the object of measurement is d Determine the inductance value $L_{0,d,f2}$ of the coil (14) in a measurement carried out exclusively with respect to a component (17) as the object of measurement made of ferromagnetic material, the coil (14) being acted upon with a second alternating current frequency f2; the distance between the coil form (13) and the object of measurement is d Convert the determined inductance value $L_{0,d,f2}$ to a dimensionless characteristic value K Convert the characteristic value K with the aid of a distance characteristic into the value of distance d Determine the inductance value $L_{x,d,f1}$ of the coil (14) in a measurement carried out with respect to the layer (20) to be determined, the coil (14) being acted upon with the first alternating current frequency f1; the distance between the coil form (13) and the coated component (17) is d Convert the determined inductance values $L_{0,d,f1}$ and $L_{x,d,f1}$ to a dimensionless measured value $M_e$ Convert the measured value $M_e$ with the aid of a family of calibration curves with consideration for the determined value of distance d to a layer thickness value a.

2. The method as recited in claim 1,
wherein
the dimensionless characteristic value K is determined using equation (1):

$$K = A \cdot \frac{L_{0,d,f2} - L_{0,\max,f2}}{L_{0,\min,f2} + L_{0,\max,f2}}, \quad (1)$$

In which $L_{0,d,f2}$=inductance value determined in the 2nd premeasurement $L_{0,\min,f2}$=inductance value at a minimum distance between the coil form (13) and the object of measurement $L_{0,\max,f2}$=inductance value at a maximum distance between the coil form (13) and the object of measurement A=constant factor.

3. The method as recited in claim 2,
wherein,
factor A is 100.

4. The method as recited in claim 1,
wherein
the dimensionless measured value $M_e$ is determined with the aid of equation (2):

$$M_e = B \cdot \frac{L_{x,d,f1} - L_{0,d,f1}}{L_{\infty,AB,f1} - L_{0,AB,f1}}, \quad (2)$$

In which $L_{x,d,f1}$=inductance value determined in the post-measurement $L_{0,d,f1}$=inductance value determined in the 1st premeasurement $L_{\infty,AB,f1}$=inductance value of the coil (14) determined in a measurement carried out exclusively with respect to an object of measurement made of the electrically conductive material; the value of distance d between the coil form (13) and the object of measurement is to AB $L_{0,AB,f1}$=inductance value of the coil (14) determined in a measurement carried out exclusively with respect to an object of measurement made of the ferromagnetic material; the value of distance d between the coil form (13) and the object of measurement is AB B=constant factor.

5. The method as recited in claim 4,
wherein,
factor B is 1000.

6. The method as recited in claim 1,
wherein
the first alternating current frequency f1 is a frequency from the high-frequency range.

7. The method as recited in claim 1,
wherein
the second alternating current frequency f2 is a frequency from the low-frequency range.

8. The method as recited in claim 4,
wherein
the value AB of the distance d that is selected is half the sum of the minimum and maximum distance between the coil form (13) and the object of measurement.

9. The method as recited in claim 1,
wherein
the family of calibration curves includes a plurality of calibration curves, each of which represents a concrete, unique distance.

10. The method as recited in claim 9,
wherein
from the family of calibration curves, a calibration curve is selected to convert measured value $M_e$ to a layer thickness value a, the distance parameter value of which has the smallest deviation from the determined distance d.

* * * * *